United States Patent
Hwang

(10) Patent No.: US 9,869,771 B2
(45) Date of Patent: Jan. 16, 2018

(54) INFORMATION SHARING SYSTEM FOR VEHICLE

(71) Applicant: Hyundai Motor Company, Seoul (KR)

(72) Inventor: Chang Sik Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/264,699

(22) Filed: Sep. 14, 2016

(65) Prior Publication Data

US 2017/0102463 A1 Apr. 13, 2017

(30) Foreign Application Priority Data

Oct. 7, 2015 (KR) ........................ 10-2015-0141221

(51) Int. Cl.
| | |
|---|---|
| G01S 19/17 | (2010.01) |
| G08B 25/10 | (2006.01) |
| H04W 4/22 | (2009.01) |
| G08B 25/01 | (2006.01) |
| G01S 5/00 | (2006.01) |

(52) U.S. Cl.
CPC ............ *G01S 19/17* (2013.01); *G01S 5/0027* (2013.01); *G08B 25/016* (2013.01); *G08B 25/10* (2013.01); *H04W 4/22* (2013.01)

(58) Field of Classification Search
CPC ........... G01S 19/17; G08B 25/10; H04W 4/22
See application file for complete search history.

(56) References Cited

U.S. PATENT DOCUMENTS

| | | | |
|---|---|---|---|
| 2012/0146766 A1* | 6/2012 | Geisler | G07C 5/008 340/8.1 |
| 2012/0149356 A1* | 6/2012 | Arun | H04M 1/6075 455/419 |
| 2013/0191020 A1* | 7/2013 | Emani | G08G 1/096816 701/468 |
| 2014/0114696 A1* | 4/2014 | Amigo | G07C 5/008 705/4 |
| 2015/0201297 A1* | 7/2015 | Sauerbrey | H04W 4/008 340/436 |
| 2015/0264627 A1* | 9/2015 | Perdomo | H04W 40/12 370/329 |

FOREIGN PATENT DOCUMENTS

| | | |
|---|---|---|
| JP | 2000-293775 A | 10/2000 |
| JP | 2001-116556 A | 4/2001 |

* cited by examiner

*Primary Examiner* — Qun Shen
(74) *Attorney, Agent, or Firm* — Mintz Levin Cohn Ferris Glovsky and Popeo, P.C.; Peter F. Corless

(57) ABSTRACT

An information sharing system for a vehicle includes: an emergency call system installed in the vehicle and operable to determine whether an accident involving the vehicle occurs; a navigation system installed in the vehicle and operable to determine a driving route for a user of the vehicle; a global navigation satellite system (GNSS) signal receiving unit receiving a GNSS signal transmitted from a GNSS satellite; and a GNSS signal distribution unit transmitting the received GNSS signal to the emergency call system and the navigation system.

7 Claims, 2 Drawing Sheets

INFORMATION SHARING SYSTEM FOR VEHICLE

CROSS-REFERENCE TO RELATED APPLICATION

This application claims priority to and the benefit of Korean Patent Application No. 10-2015-0141221 filed in the Korean Intellectual Property Office on Oct. 7, 2015, the entire contents of which are incorporated herein by reference as if fully set forth herein.

BACKGROUND OF THE DISCLOSURE (a) Technical Field

The present disclosure relates generally to an information sharing system for a vehicle and, more particularly, relates to an information sharing system transmitting vehicle information collected through an emergency call system to a navigation system and transmitting vehicle information collected through the navigation system to the emergency call system for the vehicle.

(b) Description of the Related Art

Recently, emergency call systems (hereinafter, referred to as an "Ecall system") have been equipped in vehicles to assist in a rescue when a traffic accident occurs. Certain regulations require the installation of an Ecall system in vehicles of all kinds, including the European Union (EU).

The Ecall (Emergency Call) system is installed provides an emergency call for the vehicle in which the system is equipped capable of automatically initiating the rescue when a traffic accident occurs. In detail, when a traffic accident has been detected, e.g., by an airbag deployment, etc., the Ecall system automatically reports the occurrence of the accident and transmits traffic accident information, including a location of the accident, a vehicle type, a driving direction, a fuel type, etc., to a rescue center through a Subscriber Identification Module (SIM) card mounted in the vehicle. The Ecall system receives position information through a Global Navigation Satellite System (GNSS) antenna and is supplied with a power source through a built-in battery.

When using the Ecall system, high reliability is required quickly after the accident, to ensure that the rescue is possible. However, it may be difficult to report the position of the accident occurrence to the rescue center when the GNSS antenna is disordered or damaged, such that it is not properly operating or the built-in battery has been discharged.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure provides a system in which an emergency call system and a navigation system for a vehicle share vehicle information.

An information sharing system for a vehicle according to embodiments of the present disclosure includes: an emergency call system installed in the vehicle and operable to determine whether an accident involving the vehicle occurs; a navigation system installed in the vehicle and operable to determine a driving route for a user of the vehicle; a global navigation satellite system (GNSS) signal receiving unit receiving a GNSS signal transmitted from a GNSS satellite; and a GNSS signal distribution unit transmitting the received GNSS signal to the emergency call system and the navigation system.

The emergency call system and the navigation system may be connected to each other through a vehicle network of the vehicle.

The emergency call system may include a first position information generation unit receiving the GNSS signal transmitted from the GNSS signal distribution unit and generating first position information of the vehicle based on the received GNSS signal; and a first vehicle information transmitting/receiving unit transmitting the generated first position information to the navigation system.

The emergency call system may further include a first accident information collection unit collecting first accident information of the vehicle; an accident occurrence determining unit determining whether the accident occurs based on the collected first accident information; a rescue requirement unit transmitting the first accident information and the first position information to an accident-processing organization; and a battery unit supplying power to the emergency call system.

The navigation system may include a second position information generation unit receiving the GNSS signal transmitted from the signal distribution unit and generating second position information of the vehicle based on the received GNSS signal; and a second vehicle information transmitting/receiving unit transmitting the generated second position information to the emergency call system.

The navigation system may further include a second accident information collection unit collecting second accident information of the vehicle, whereby the second vehicle information transmitting/receiving unit transmits the second position information and the second accident information to the emergency call system.

Furthermore, according to embodiments of the present disclosure, an information sharing method for a vehicle includes: receiving, at a global navigation satellite system (GNSS) signal receiving unit, a GNSS signal transmitted from a GNSS satellite; and transmitting, by a GNSS signal distribution unit, the received GNSS signal to an emergency call system installed in the vehicle and a navigation system installed in the vehicle. The emergency call system is operable to determine whether an accident involving the vehicle occurs, and the navigation system is operable to determine a driving route for a user of the vehicle.

According to embodiments of the present disclosure, the emergency call system and the navigation system for the vehicle may share the position information of the vehicle and may share the accident information when an accident involving the vehicle occurs.

<Description of symbols>

Figure 1:
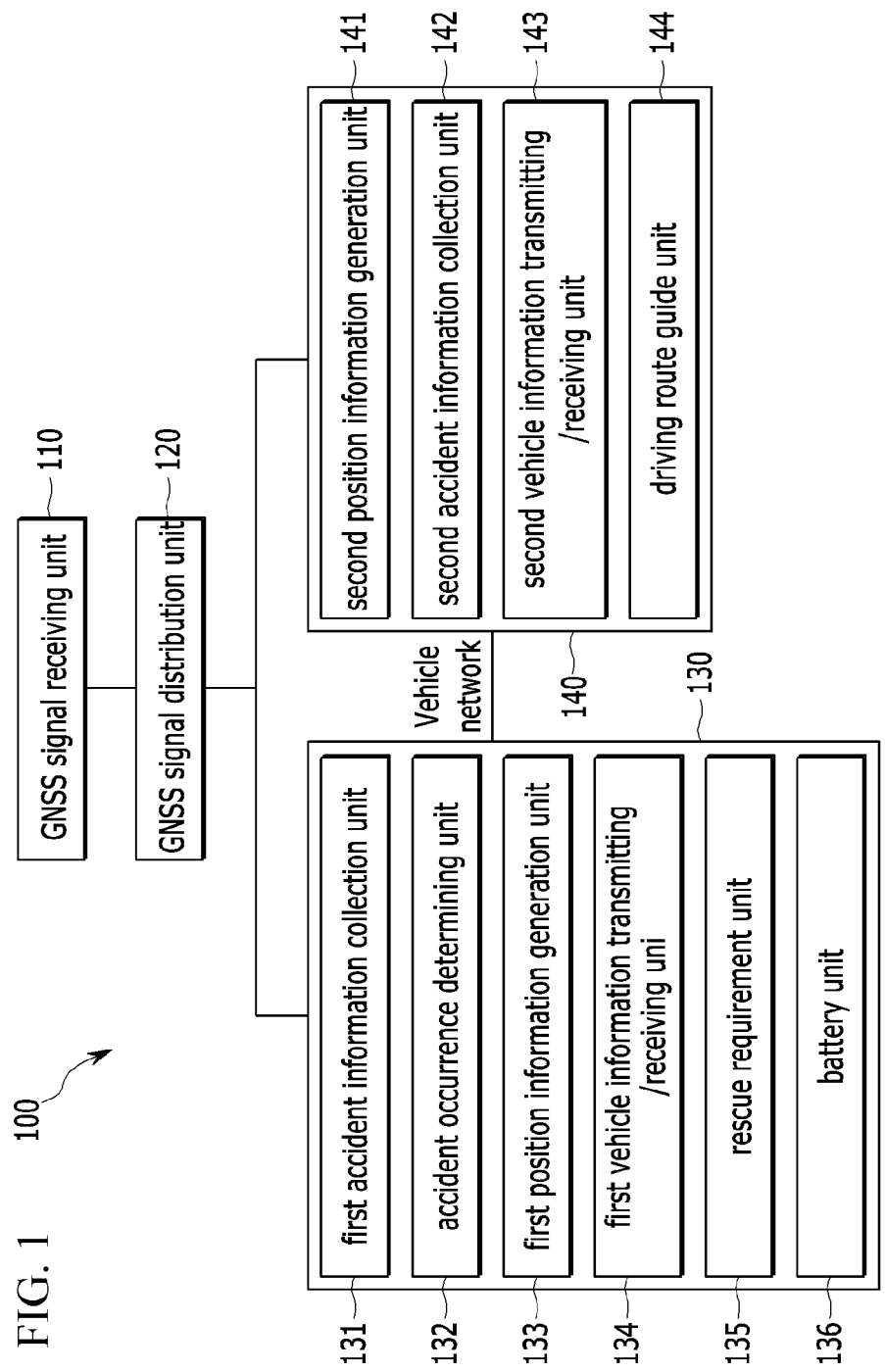
FIG. 1 is a view showing a configuration of an information sharing system according to embodiments of the present disclosure.

| | |
|---|---|
| 100: information sharing system | 110: GNSS signal receiving unit |
| 120: GNSS signal distribution unit | 130: emergency |

-continued

<Description of symbols>

| | |
|---|---|
| 131: first accident information collection unit | call system |
| | 132: accident occurrence determining unit |
| 133: first position information generation unit | 134: first vehicle information transmitting/receiving unit |
| 135: rescue requirement unit | 136: battery unit |
| 140: navigation system | 141: second position information generation unit |
| 142: second accident information collection unit | 143: second vehicle information transmitting/receiving unit |
| 144: driving route guide unit | |

DETAILED DESCRIPTION OF THE EMBODIMENTS

In the following detailed description, only certain embodiments of the present disclosure have been shown and described, simply by way of illustration. As those skilled in the art would realize, the described embodiments may be modified in various different ways, all without departing from the spirit or scope of the present disclosure. The drawings and description are to be regarded as illustrative in nature and not restrictive, and like reference numerals designate like or similar elements through the specification. Also, in a case of the well-known technique, detailed description thereof will be omitted.

The terminology used herein is for the purpose of describing particular embodiments only and is not intended to be limiting of the disclosure. Throughout this specification and the claims which follow, unless explicitly described to the contrary, the word "comprise" or variations such as "comprises" or "comprising" will be understood to imply the inclusion of stated elements but not the exclusion of any other elements. Also, the terms unit, device, and module in the present specification represent a unit for processing a predetermined function or operation, which can be realized by hardware, software, or a combination of hardware and software.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

FIG. 1 is a view showing a configuration of an information sharing system according to embodiments of the present disclosure.

As shown in FIG. 1, an information sharing system 100 includes a global navigation satellite system (GNSS) signal receiving unit 110, a GNSS signal distribution unit 120, an emergency call system 130, and a navigation system 140. In this case, the emergency call system 130 and the navigation system 140 are connected to each other through a vehicle network. According to embodiments of the present disclosure, the emergency call system 130 and the navigation system 140 are connected through a Controller Area Network (CAN), however the present disclosure is not limited thereto.

The GNSS signal receiving unit 110 receives a GNSS signal transmitted from a GNSS satellite through an antenna.

The GNSS signal distribution unit 120 transmits the GNSS signal received from the GNSS signal receiving unit 110 to the emergency call system 130 and the navigation system 140.

The emergency call system 130 is installed in the vehicle, reports an accident occurrence to an accident-processing organization, and transmits accident information when it is determined that the accident occurs. In this case, the accident-processing organization may include any company to which a vehicular accident could be reported, such as, for instance, a police station, a fire station, a hospital, an insurance company, a tow company, etc.

The emergency call system 130 includes a first accident information collection unit 131, an accident occurrence determining unit 132, a first position information generation unit 133, a first vehicle information transmitting/receiving unit 134, a rescue requirement unit 135, and a battery unit 136.

The first accident information collection unit 131 includes at least one sensor and collects first accident information. In this case, the first accident information includes information indicating at least one of an air back expansion, an impact amount, an impact sound, and a rapid deceleration.

The accident occurrence determining unit 132 determines whether the accident occurs based on the first accident information generated from the first accident information collection unit 131. In detail, a measured value included in the first accident information and a predetermined threshold value are compared, and it is determined that the accident occurs when the measured value included in the first accident information is greater than the threshold value. Also, the accident occurrence determining unit 132 determines whether the accident occurs based on the second accident information transmitted from the navigation system 140.

The first position information generation unit 133 generates the first position information of the vehicle based on the GNSS signal transmitted from the GNSS signal distribution unit 120.

The first vehicle information transmitting/receiving unit 134 transmits the first position information generated from the first position information generation unit 133 and the first accident information connected in the first accident information collection unit 131 to the navigation system 140. Also, the first vehicle information transmitting/receiving unit 134 receives the second position information and the second accident information transmitted from the navigation system 140. The first vehicle information transmitting/receiving unit 134 together transmits first time information respectively corresponding to the first position information and the first accident information to the navigation system 140. Also, a reliability of the second position information and the second accident information may be determined based on second time information corresponding to the received second position information and second accident information.

The rescue requirement unit 135 transmits the first position information and the first accident information to the accident processing related organization through a cellular network when it is determined that the accident occurs through the accident occurrence determining unit 132. Also, the rescue requirement unit 135 may transmit the second position information and the second accident information.

The battery unit 136 supplies the power source to the emergency call system 130.

The navigation system 140 is installed in the vehicle and provides a driving route for a user (e.g., driver, passenger, etc.) of the vehicle based on the current position information of the vehicle and destination information set by the driver.

The navigation system 140 includes a second position information generation unit 141, a second accident information collection unit 142, a second vehicle information transmitting/receiving unit 143, and a driving route guide unit 144.

The second position information generation unit 141 generates the second position information of the vehicle based on the GNSS signal transmitted from the GNSS signal distribution unit 120.

The second accident information collection unit 142 includes a camera to collect the second accident information. Also, the second accident information is transmitted from a telematics device, an event data recorder (EDR), or at least one sensor connected through the vehicle network. In this case, the second accident information includes information indicating at least one of an airbag deployment, an impact amount, an impact sound, a rapid deceleration, the vehicle speed, the driving direction, an image in or around the vehicle, and a video in or around the vehicle.

The second vehicle information transmitting/receiving unit 143 transmits the second position information generated from the second position information generation unit 141 and the second accident information collected from the second accident information collection unit 142 to the emergency call system 130. Also, the first position information and the first accident information transmitted from the emergency call system 130 are received. The second vehicle information transmitting/receiving unit 143 together transmits the second time information respectively corresponding to the second position information and the second accident information to the emergency call system 130. Also, the reliability of the first position information and the first accident information may be determined based on the first time information included in the received first position information and first accident information.

The driving route guide unit 144 receives the destination information input from the vehicle driver and outputs the driving route based on the second position information and the received destination information.

Figure 2:
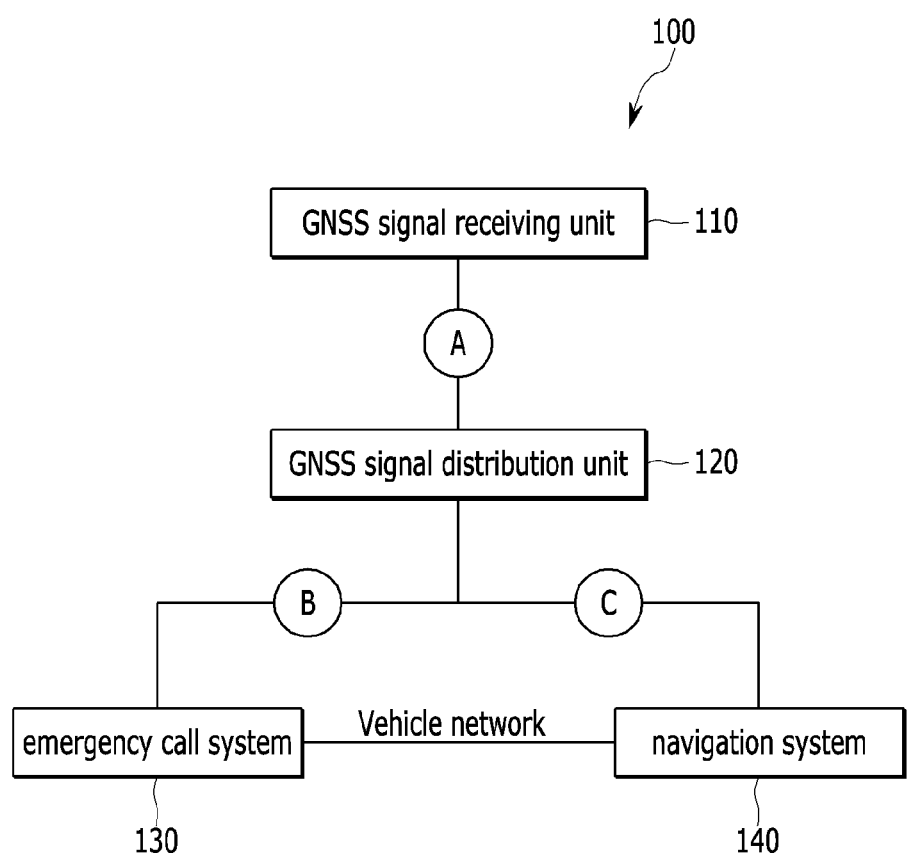
FIG. 2 is a view showing a stability checking method of an information sharing system according to embodiments of the present disclosure.

FIG. 2 is a view showing a stability checking method of an information sharing system according to embodiments of the present disclosure.

As shown in FIG. 2, it may be determined whether an error of the information sharing system 100 occurs by measuring the current and the voltage of intervals A, B, and C. For example, when the measuring values of the current and the voltage of the interval B are outside an error range of a predetermined threshold value, it may be determined that the emergency call system 130 is not normally operating. Also, when the measuring values of the current and the voltage of the interval C are outside the error range of the predetermined threshold value, it may be determined that the navigation system 140 is not normally operating. Also, when the measuring values of the currents and the voltages of the interval Q, or the interval B and the interval C are outside the error range of the predetermined threshold value, it may be determined that all of the emergency call system 130 and the navigation system 140 are not normally operating. Accordingly, as the error occurrence interval is accuracy checked to solve the error, the device reliability of the emergency call system 130 and the navigation system 140 may be improved.

According to embodiments of the present disclosure, since the emergency call system 130 is driven by the power supplied through the battery unit 136, even if the vehicle power is not normally supplied such that the navigation system 140 is not normally boot, the first position information may be normally generated and may be transmitted to the vehicle network. Also, by transmitting the first accident information collected through the sensor included in the emergency call system 130 and the second accident information received from the navigation system 140 to the accident-processing organization, objective information for the situation after and before the accident occurrence may be provided to the accident processing related organization.

Further, according to embodiments of the present disclosure, even if the vehicle power is not normally supplied to the navigation system 140 and the booting is delayed, the driving route and the current position information may be output based on the first position information transmitted from the emergency call system 130.

Even further, according to embodiments of the present disclosure, the emergency call system 130 and the navigation system 140 share one GNSS signal receiving unit 110 such that the manufacturing cost may be reduced.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. An information sharing system for a vehicle, the system comprising: an emergency call system installed in the vehicle and operable to determine whether an accident involving the vehicle occurs; a navigation system installed in the vehicle and operable to determine a driving route for a user of the vehicle; a global navigation satellite system (GNSS) signal receiving unit receiving a GNSS signal transmitted from a GNSS satellite; and a GNSS signal distribution unit transmitting the received GNSS signal to the emergency call system and the navigation system, wherein the emergency call system generates first position information of the vehicle based on the GNSS signal received from the GNSS signal distribution unit and transmits the generated first position information to the navigation system, and the navigation system generates second position information of the vehicle based on the GNSS signal received from the GNSS signal distribution unit and transmits the generated second position information to the emergency call system, wherein the navigation system outputs the driving route and a current position of the vehicle based on position information received from the emergency call system when booting of the navigation system is delayed.

2. The information sharing system of claim 1, wherein the emergency call system and the navigation system are connected to each other through a vehicle network of the vehicle.

3. The information sharing system of claim 1, wherein the emergency call system includes:
   a first position information generation unit receiving the GNSS signal transmitted from the GNSS signal distribution unit and generating first position information of the vehicle based on the received GNSS signal; and
   a first vehicle information transmitting/receiving unit transmitting the generated first position information to the navigation system.

4. The information sharing system of claim 3, wherein the emergency call system further includes:
   a first accident information collection unit collecting first accident information of the vehicle;
   an accident occurrence determining unit determining whether the accident occurs based on the collected first accident information;
   a rescue requirement unit transmitting the first accident information and the first position information to an accident-processing organization; and
   a battery unit supplying power to the emergency call system.

5. The information sharing system of claim 1, wherein the navigation system includes:
   a second position information generation unit receiving the GNSS signal transmitted from the signal distribution unit and generating second position information of the vehicle based on the received GNSS signal; and
   a second vehicle information transmitting/receiving unit transmitting the generated second position information to the emergency call system.

6. The information sharing system of claim 5, wherein the navigation system further includes:
   a second accident information collection unit collecting second accident information of the vehicle,
   wherein the second vehicle information transmitting/receiving unit transmits the second position information and the second accident information to the emergency call system.

7. An information sharing method for a vehicle, the method comprising: receiving, at a global navigation satellite system (GNSS) signal receiving unit, a GNSS signal transmitted from a GNSS satellite; and transmitting, by a GNSS signal distribution unit, the received GNSS signal to an emergency call system installed in the vehicle and a navigation system installed in the vehicle, wherein the emergency call system is operable to determine whether an accident involving the vehicle occurs, the navigation system is operable to determine a driving route for a user of the vehicle, the emergency call system generates first position information of the vehicle based on the GNSS signal received from the GNSS signal distribution unit and transmits the generated first position information to the navigation system, and the navigation system generates second position information of the vehicle based on the GNSS signal received from the GNSS signal distribution unit and transmits the generated second position information to the emergency call system, wherein the navigation system outputs the driving route and a current position of the vehicle based on position information received from the emergency call system when booting of the navigation system is delayed.

\* \* \* \* \*